United States Patent [19]
Osborn et al.

[11] 3,947,101
[45] Mar. 30, 1976

[54] MECHANICAL DRIVE ARRANGEMENTS

[75] Inventors: Leroy Gordon Osborn, Mill Hill; George Hunnam Brownlee, Harrow, both of England

[73] Assignee: Westrex Company Limited, London, England

[22] Filed: June 21, 1974

[21] Appl. No.: 481,722

[30] Foreign Application Priority Data
June 25, 1973 United Kingdom............. 30016/73

[52] U.S. Cl. ................ 352/187; 352/164; 352/190
[51] Int. Cl.² ......................................... G03B 1/24
[58] Field of Search .......... 352/160, 163, 164, 187, 352/190

[56] References Cited
UNITED STATES PATENTS

| | | | |
|---|---|---|---|
| 1,418,570 | 6/1922 | Horton............................. | 352/163 |
| 2,257,197 | 9/1941 | Serrurier........................ | 352/163 X |
| 2,478,679 | 8/1949 | Bartelson....................... | 352/164 |

*Primary Examiner*—Monroe H. Hayes
*Attorney, Agent, or Firm*—Thomas A. Turner, Jr.; Alan C. Rose

[57] ABSTRACT

A mechanical drive arrangement for a cinematograph projector. A double-sided tooth drive belt passes, in succession, over a motor driven, film take-up sprocket, idler sprocket, intermittent drive sprocket, film feed sprocket and shutter drive sprocket. The intermittent drive sprocket and intermittent motion film sprocket are mounted on a rotatable disc. The axis of rotation of the disc coincides with the circumference of the intermittent drive sprocket at the point where the plane through the axes of both mounted sprockets cuts the region of engagement of the drive belt around that circumference. In consequence, rotation of the disc moves the film anchor point, on the intermittent motion film sprocket, with only slight rotation of the shutter drive. Thereby, ghosting is avoided when racking.

7 Claims, 1 Drawing Figure

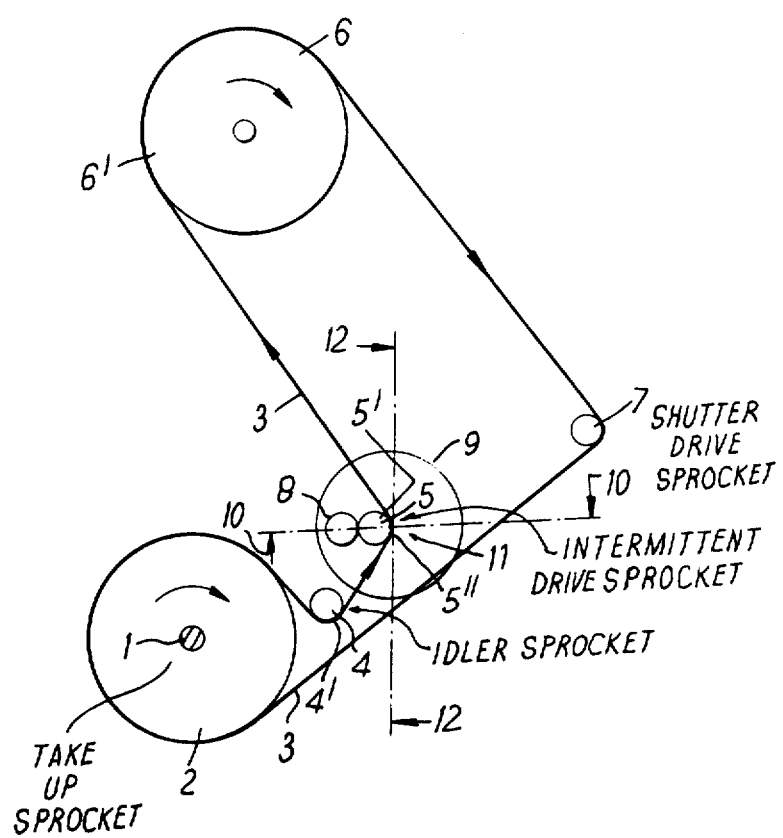

MECHANICAL DRIVE ARRANGEMENTS

This invention relates to mechanical drive arrangements and particularly to mechanical drive arrangements for cinematograph projectors.

Cinematograph projectors commonly have a mechanical drive arrangement which simultaneously drives a film feed sprocket, a film take-up sprocket, an intermittent drive arrangement for moving film intermittently past the film projector gate and a synchronized shutter.

The object of the present invention is to provide an improved mechanical drive arrangement particularly for this purpose.

Accordingly, the invention provides a mechanical drive arrangement, particularly for cinematograph projectors, comprising drive means, first and second sprockets, a double-sided toothed drive belt passing over both the first and second sprockets, drivingly engaging a shutter drive sprocket and an intermittent motion drive sprocket, the intermittent motion drive sprocket and the associated intermittent motion film sprocket being mounted for rotation together about a centre lying on a tangent to the intermittent drive sprocket. Preferably, the centre of rotation lies on the intermittent motion film sprocket circumference at the mid point of engagement of the drive belt.

Preferably, also, a line joining the centres of the intermittent motion film sprocket and of the intermittent drive sprocket intersects the circumference of the intermittent drive sprocket at the point coincident with the said centre of rotation and, further, the path of the drive belt towards and away from the intermittent drive sprocket forms equal angles with the said line joining the said sprocket centres, for the preferred mean rotational position of the said sprockets.

Conveniently, the first and second sprockets are film feed and film take-up sprockets, respectively.

Conveniently, the drive pulley, is tensioned by an idler sprocket and this sprocket may conveniently be positioned to determine the path of the drive belt either towards or away from the intermittent drive sprocket.

The drive means may conveniently drive one of the said first and second sprockets.

In order that the invention may be readily carried into practice, one embodiment thereof will now be described in detail, by way of example, with reference to the accompanying drawing, the sole FIGURE of which is a diagram showing a mechanical drive arrangement, in accordance with the invention, for a cinematograph projector.

In the mechanical drive arrangement shown in the drawing, drive means, not shown, drives the shaft 1 of a film take-up sprocket 2 to rotate the sprocket 2 in the clockwise sense, as viewed in the drawing.

A double-sided toothed belt 3 passes around the film take-up sprocket 2, over an idler sprocket 4, around an intermittent motion drive sprocket 5, around a film feed sprocket 6, around a shutter drive sprocket 7 and back to the sprocket 2, as shown. The film feed sprocket 6 and the shutter drive sprocket 7 are both driven in the clockwise sense, as viewed in the drawing. The intermittent motion drive sprocket 5 is driven in the counter-clockwise sense.

The intermittent motion drive sprocket 5 and an intermittent motion film sprocket 8 are together mounted upon a rotatable disc 9. As will be seen from the drawing, the line 10—10 joining the centres of the sprockets 8 and 5, when extended, intersects the circumference of the sprocket 5 at a point 11. A tangent 12—12 is drawn to the circumference of sprocket 5 at the point 11. The centre of rotation of disc 9 lies on tangent 12—12 and, in fact, coincides with point 11, all the said lines and points referred to in this construction lying in the plane of the drawing.

The drive belt 3 is tangential to drive sprocket 5 at points $5^1$ and $5^{11}$ and is tangential to idler sprocket 4 at point $4^1$. In the rotational position of disc 9 shown in the drawing, the paths $6^1$ - $5^1$ and $5^{11}$ - 4 make equal angles with the line 10—10, shown as angles A and B in the drawing.

In operation, sprocket 2 is driven from drive shaft 1, driving the drive belt 3 which, in turn, drives the intermittent motion drive sprocket 5, the sprocket 6 and the shutter drive sprocket 7.

Rotation of disc 9 rotates the intermittent motion film sprocket 8 about centre 11, and thereby racks the film, not shown, which passes over the intermittent motion film sprocket 8, for adjustment of the film frame in the projector gate in the vertical direction. The available rotational motion raises or lowers the projected film image by a distance equal to one picture frame height.

Due to the geometry described, the racking of the film by rotation of disc 9 results in only small longitudinal movement of drive belt 3 and hence only small rotation of shutter sprocket 7. Rotation of sprocket 7 would result in a displacement drive of the associated shutter, causing loss of synchronism of shutter and intermittent motions and hence "ghosting" of the image on the screen.

Synchronism between the shutter and intermittent motions is held for all normal adjustment of disc 9 for film racking and the geometry is such as to provide this operational advantage together with simplicity of lay-out and assembly.

Using the geometry described, the degree to which synchronism between shutter and intermittent motions is lost by rotational adjustment of disc 9 is dependent upon the relative diameters of the linked sprockets 5 and 8. In the example described, they are of equal diameter.

The rolling action of the intermittent drive sprocket 5 on the drive belt 3 is required to be such that the belt 3 undergoes minimal longitudinal displacement due to rotation of disc 9. Satisfying this requirement in practice is a compromise between the belt sprocket diameters and the angle of wrap of belt 3 on sprocket 5 to provide adequate power transmission without belt jump.

What we claim is:

1. A mechanical drive arrangement particularly for cinematograph projectors, comprising:
    a. drive means drivingly engaging a double-sided toothed drive belt;
    b. a first sprocket and a second sprocket adapted to be engaged by said drive belt;
    c. shutter drive sprocket drivingly engaged by said drive belt;
    d. intermittent motion drive sprocket drivingly engaged by said drive belt, said intermittent motion drive sprocket being rotatably mounted on disc means rotatable about a center of said disc means, which center coincides with a circumference of said intermittent motion drive sprocket; and e. intermittent motion film sprocket rotatably mounted on said disc means, and being adapted to be drivingly engaged by said intermittent motion drive sprocket, whereby upon rotation of said disc means, said drive belt engages said intermittent motion drive sprocket substantially on a tangent point of a circumference of said intermittent motion drive sprocket.

2. A mechanical drive arrangement as claimed in claim 1 wherein said disc means comprises a substantially planar disc rotatable about a disc axis having said rotatable intermittent motion drive sprocket and said intermittent motion film sprocket rotatably mounted on respectively an intermittent motion drive sprocket axis and an intermittent motion film sprocket axis perpendicular to a plane of said disc, wherein a midpoint of engagement of said drive belt with said intermittent drive sprocket coincides with the said disc axis.

3. A mechanical drive arrangement as claimed in claim 2 wherein said intermittent motion drive sprocket axis, said intermittent motion film sprocket axis and said disc axis lie parallel to each other in a common plane.

4. A mechanical drive arrangement as claimed in claim 3 wherein said drive belt intersects said common plane at equal angles on opposite sides of the engagement of said drive belt with said intermittent motion drive sprocket.

5. A mechanical drive arrangement as claimed in claim 1 wherein said first sprocket comprises a film feed sprocket, and wherein said second sprocket comprises a film take-up sprocket.

6. A mechanical drive arrangement as claimed in claim 1, further comprising an idler sprocket adapted to be tensionally engaged by said drive belt, whereby upon selective positioning of said idler sprocket into and out of greater tension with said drive belt, the engagement of said drive belt with said intermittent motion drive sprocket can be changed.

7. A mechanical drive arrangement as claimed in claim 1 wherein said drive means includes means driving one of said first sprocket and said second sprocket.

* * * * *